Feb. 21, 1928.

C. L. BAUSCH 1,659,560

LENS GRINDING MACHINE

Filed Sept. 17, 1921

INVENTOR.
Carl L. Bausch
BY
his ATTORNEY

Feb. 21, 1928.

C. L. BAUSCH

1,659,560

LENS GRINDING MACHINE

Filed Sept. 17, 1921 7 Sheets-Sheet 6

INVENTOR
Carl L. Bausch
BY
his ATTORNEY

Feb. 21, 1928.

C. L. BAUSCH 1,659,560

LENS GRINDING MACHINE

Filed Sept. 17, 1921        7 Sheets-Sheet 7

INVENTOR.
Carl L. Bausch.
BY
his ATTORNEY

Patented Feb. 21, 1928.

1,659,560

UNITED STATES PATENT OFFICE.

CARL L. BAUSCH, OF ROCHESTER, NEW YORK, ASSIGNOR TO BAUSCH & LOMB OPTICAL COMPANY, OF ROCHESTER, NEW YORK, A CORPORATION OF NEW YORK.

LENS-GRINDING MACHINE.

Application filed September 17, 1921. Serial No. 501,397.

This invention has to do with lens grinding machines, relating more especially to the variety adapted for grinding the peripheral edges of eye glass and spectacle lenses to produce the desired shapes, one object of the invention being to provide a practical and efficient machine for the purpose specified capable of adjustment to accommodate a variety of work, convenient to adjust and operate, and accurate and rapid in production.

Another object is the provision of a machine of the above character adapted to have a lens blank positioned thereon with reference to its optical center and axis and to shape the lens about a geometrical axis accurately and conveniently adjusted to make any desired angle with the optical axis, to obviate the work of laying out the axes preliminarily on the work.

Another object is to provide a machine capable of carrying simultaneously an assortment of formers which may be readily employed, selectively, to produce any one of a number of lens shapes, as well as improved adjustable means for determining the size of the lens produced.

Another object is to provide in a machine of this class efficient means for producing the grinding pressure and for conveniently regulating the same in accordance with the number or thickness of lenses being ground, and also effective means for finishing or polishing the ground surface.

Further objects reside in the provision of improved and advantageous means for holding the lens blank, for driving and controlling the grinding element, and the like, to which and other ends the invention consists in certain improvements and combinations of parts, all as will be hereinafter more fully described, the novel features being pointed out in the claims at the end of the specification.

In the drawings.

Similar reference numerals throughout the several views indicate the same parts.

In the embodiment herein disclosed by way of illustration of the principles involved and a practical application of the same, the invention comprises, preferably a main frame 25 adapted for support on a bench or table, with side and end walls and an open top. The side walls are formed at their tops with bearing surfaces 26, Figure 1, on which are adjustably slidable auxiliary frame portions 27 having suitable bolts 28 working in slots 29 in the bearings for guiding the auxiliary frames during adjustment and clamping the same in adjusted position. On the auxiliary frames are bearing boxes 30 in which rotates and reciprocates longitudinally a main shaft 31 having fixed thereon a grinding element or wheel 32 of any suitable material, with which cooperates a rotary lens holder carried on the main frame at the front of the machine. The ends of shaft 31 are extended beyond the frame and one end is provided with driving means, such, for example, as a pulley described hereafter, while the other end of the shaft rotates in and supports a casing 33 enclosing speed reducing gearing of the usual or any suitable variety which therefore does not require particular description. This gearing actuates means hereafter described for longitudinally reciprocating shaft 31 to move the grinding element back and forth across the lens edge, as well understood in the art. It is to be understood that casing 33 and the enclosed gearing reciprocates with the shaft but is held from rotating with the shaft by means presently to be described. The operating power for the machine is thus applied to the main shaft carrying the grinding element which in effect serves as a fly wheel and is then transmitted thru the speed reducing gearing to the lens holding device at the front of the machine.

Figure 1:
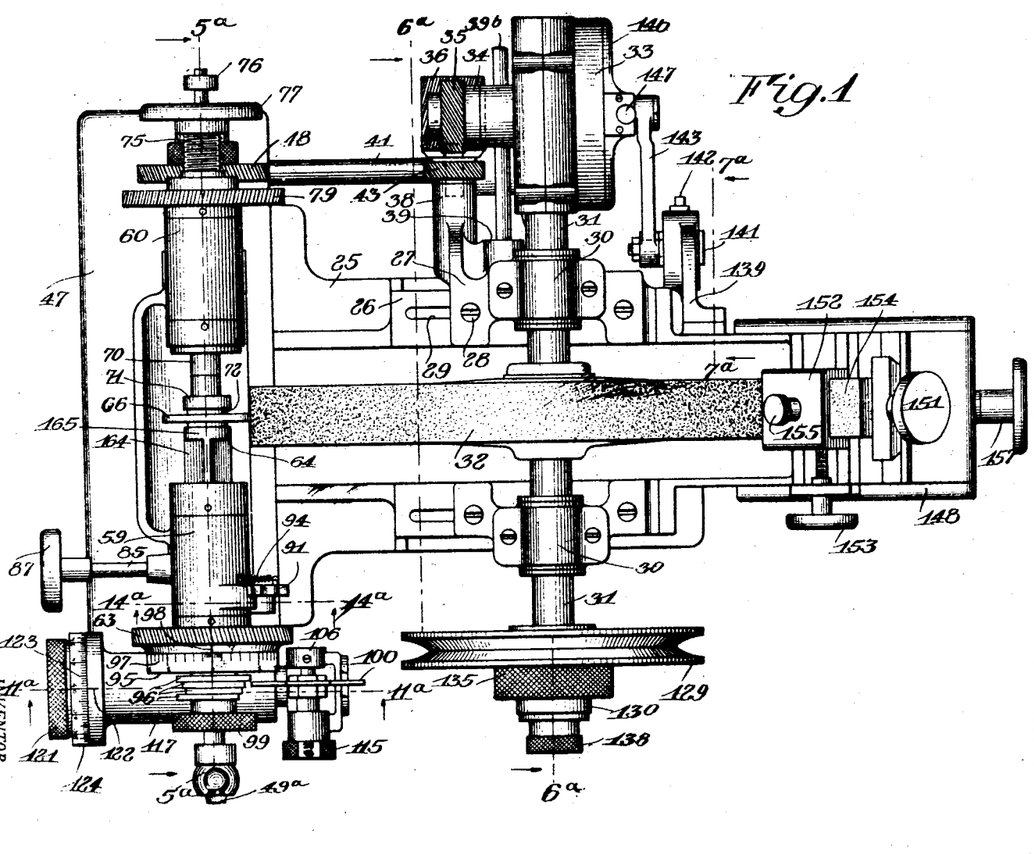
Figure 1 is a top plan view of a machine embodying the present invention.
Figures 2, 9:
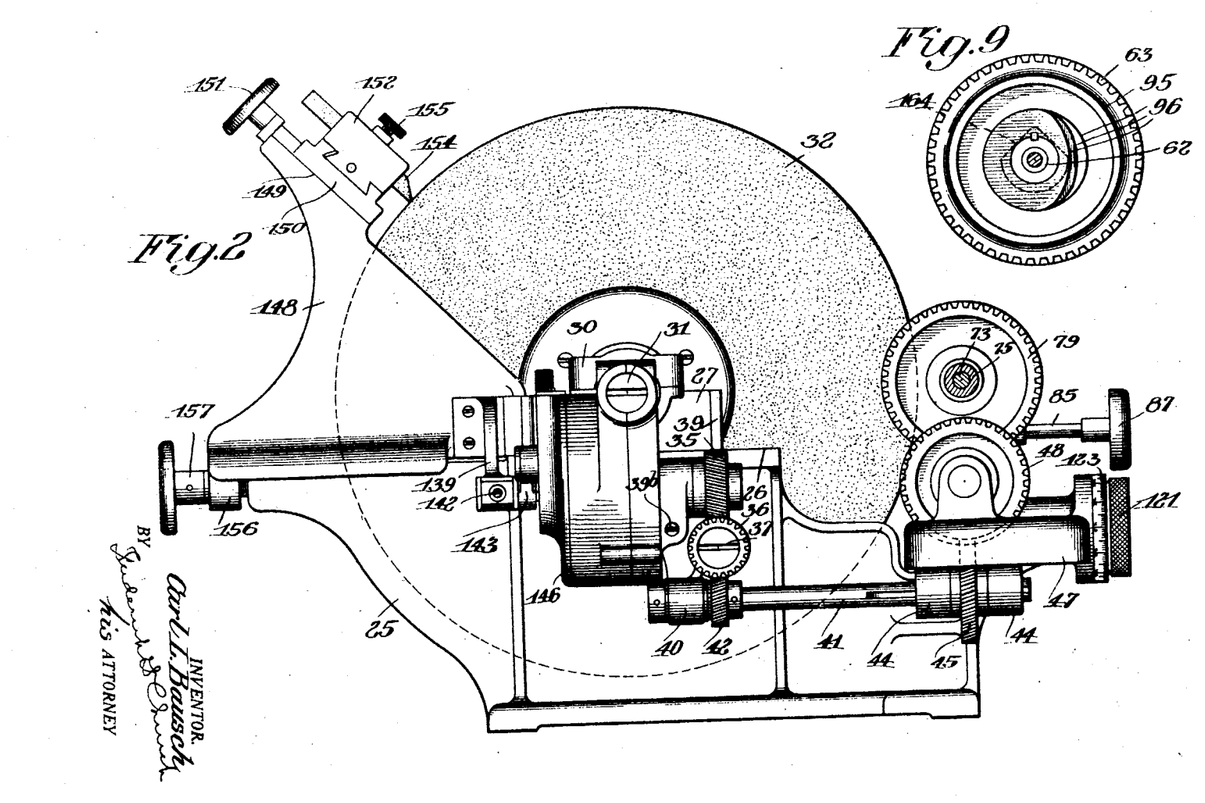
Figure 2 is a side elevation of the same.
Figure 9 is a sectional elevation on line 9ª—9ª of Figure 5 showing the former or templet device.

The driving connection with the lens holding device comprises a stub shaft 34, Figures 1 and 2, rotated by the speed reducing gearing and projecting thru the forward side of casing 33. Fixed thereon is a spiral gear 35 meshing with an elongated spiral gear 36 fixed on a short shaft 37 rotatably supported in a bearing 38 formed adjacent the lower end of an arm 39, Figure 6, depending from one of the auxiliary frames 27. The elongated form of gear 36 provides for maintaining it in mesh with its driving gear 35 during the reciprocating movement of the latter with the main shaft. Bracket 39 has formed thereon a boss 39ª, Figure 7, supporting a relatively fixed spindle 39ᵇ, Figures 1 and 2, sliding in a bearing opening in casing 33 to prevent the latter from rotating with the main shaft as it reciprocates with the same. In addition to bearing 38, bracket 39 carries also a bearing 40, Figures 2 and 6, supporting the rear end of a shaft 41 rotated by a gear 42 fixed thereon and meshing with a gear 43 fixed on the shaft 37.

Figures 4, 16:
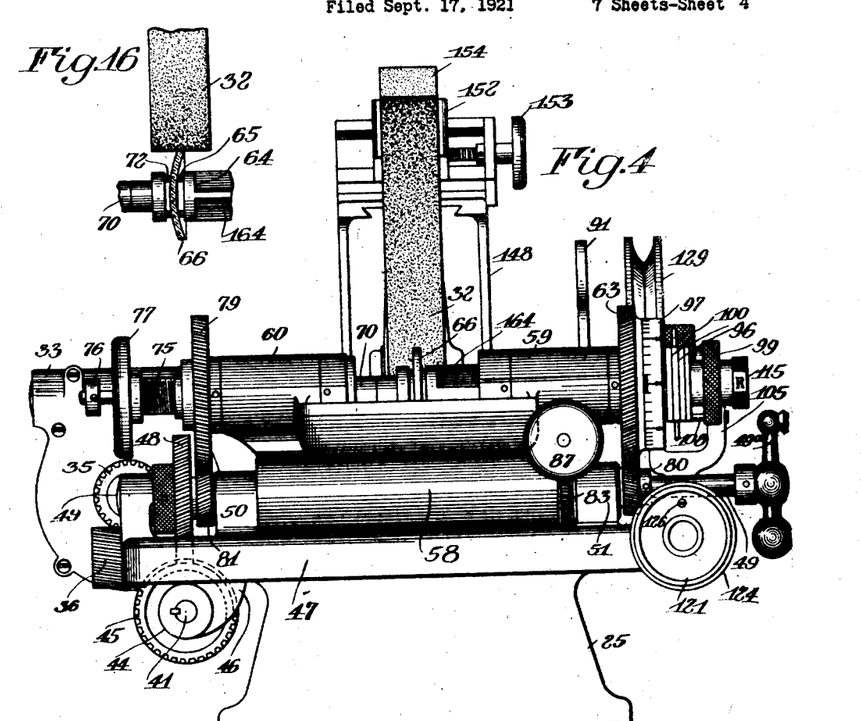
Figure 4 is a front elevation.
Figure 16 is a fragmentary view illustrating the operation of the lens holding device and grinding element.

Shaft 41 extends toward the front of the machine for driving connection with the lens holder, and is preferably supported for longitudinal movement with its supporting bracket 39 during the adjustment of the auxiliary frame 27. To this end the forward end of shaft 41 slides in spaced bearings 44 carried by brackets 46 depending from a table-like portion 47 on the front of the main frame. Splined on the shaft between the bearings is a spiral gear 45 meshing with a gear 48, Figures 4 and 5, on an actuating shaft 49 rotating in bearings 50 and 51 adjacent its ends on the table 47, and provided with gearing for rotating the lens holding spindles as hereafter described.

Gear 48 is preferably connected with shaft 49 by an overrunning form of clutch, so that while the shaft is driven by the means described above to rotate the lens spindles at a suitable grinding speed, the shaft may nevertheless be rotated at a higher speed independently of the above actuating means, as for example by a hand crank 49ª at the opposite end of the shaft, for imparting a more finished or polished surface to the lens. To this end the hub of gear 48 has formed therein a series of spaced radial bores or ways 52 Figure 10 in which slide balls 53. Shaft 49 is formed opposite these ways with a corresponding series of recesses 54 each of which has an inclined side 55, and a radial side 56. It is apparent from this construction that when gear 48 is rotated by the means described above in the direction indicated by the arrow, Figure 10, the balls 63 carried by the gear engage the radial side 58 of the shaft recesses and positively drive the shaft. If however the shaft be driven at a greater speed in the same direction, as by means of the handle 49ª, the inclined sides 55 of the shaft recesses serve to throw the balls outwardly in their ways and thus permit the shaft to be rotated independently of the gearing described.

The lens holding device is preferably supported for pivotal movement about the axis of shaft 49, for movement toward and from the grinding element. To this end bearing 50 of the shaft has fixed therein at the left end, Figure 5, a sleeve 57 on which one end of an auxiliary lens holder frame or carriage 58 is pivotally supported, the other end of the frame being similarly supported in the opposite bearing 51 as more fully described hereafter. The lens holder frame comprises generally a hollow tubular portion surrounding shaft 49 and supported as described and also spaced upwardly extending bearings 59 and 60 rotatably carrying the lens holding spindles which have their inner ends in abutting relation between the bearings for holding one or more lenses therebetween.

Figures 5, 10, 11, 12:
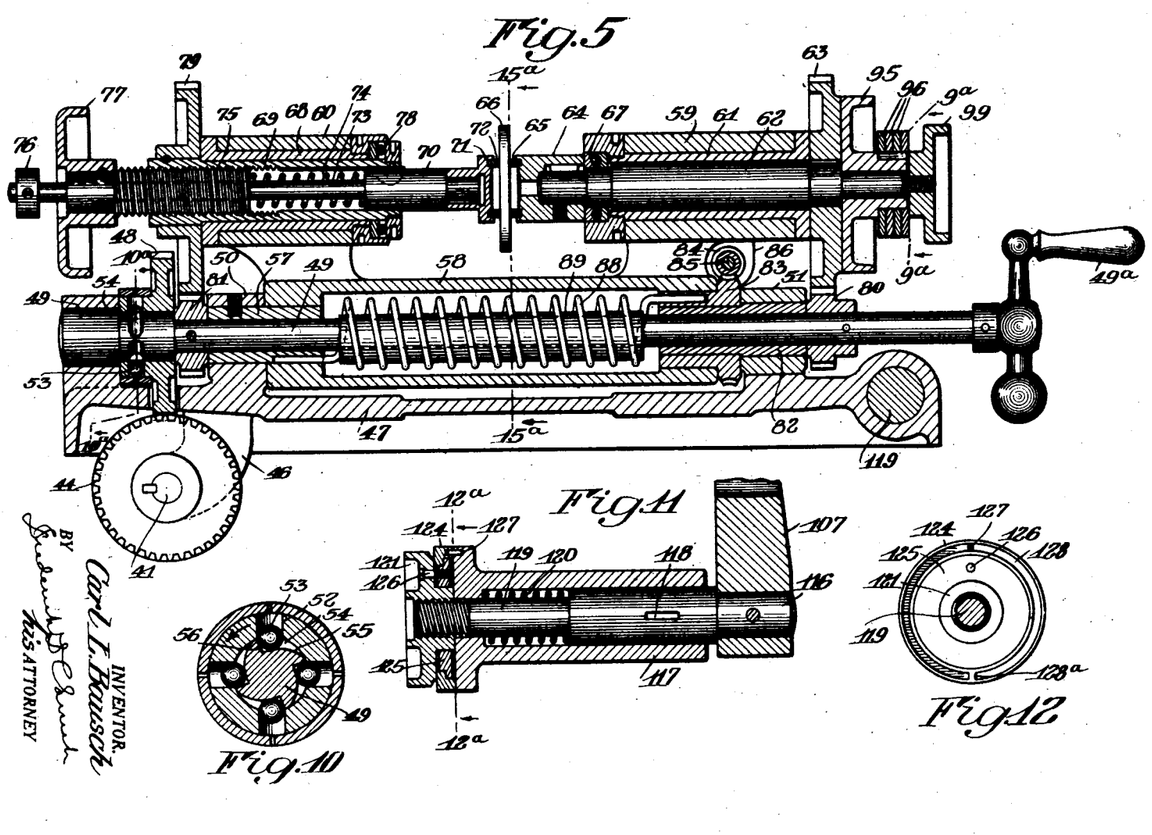
Figure 5 is an enlarged sectional elevation on the line 5ª—5ª of Figure 1.
Figure 10 is a sectional view on the line 10ª—10ª of Figure 5 showing a clutch.
Figure 11 is a sectional elevation on the line 11ª—11ª of Figure 1.
Figure 12 is a sectional view on the line 12ª—12ª of Figure 11.

Referring more particularly to the construction of the lens holding spindles and their supports, bearing 59, Figure 5, has fixed therein a bearing sleeve 61 in which is rotatably supported the right hand spindle 62. This spindle is preferably held against longitudinal movement in its bearing by means of a gear 63 fixed thereon at one end of the bearing and a lens holding face plate or head 64 detachably secured on opposite end of spindle. Head 64 carries on its face an annulus 65 of fiber, rubber or other suitable material, for gripping engagement with the lens indicated at 66. The left hand end of bearing 59 is provided with a ball and race thrust bearing 67 against which head 64 bears, for reducing the friction.

The opposite bearing 60 has fixed therein a bearing sleeve 68 rotatably supporting a sleeve 69 in which is splined for longitudinal movement the other lens holding spindle 70 detachably carrying the complementary face plate or head 71 supplied with a similar lens gripping annulus 72. Spindle 70 is thus rotated by sleeve 69 and slides longitudinally in the latter to move its face plate toward and from the opposite spindle 62 to receive or release a lens. Spindle 70 is formed within sleeve 69 with a reduced portion 73 about which is coiled a spring 74 bearing at one end against the shoulder on the spindle and at the other against a second sleeve 75 inserted in and threadedly connected with the first sleeve 69. As shown, spindle 70 slides in the bore of sleeve 75, extending beyond the latter where it carries a collar 76. Sleeve 75 carries a hand piece or wheel 77 by means of which it may be rotated and thus moved longitudinally in sleeve 69 for adjusting the tension of spring 74 and the pressure of spindle 70 against the lens. By unscrewing sleeve 75 sufficiently it may be brought into engagement with the abutment or collar 76 on the spindle and the latter positively retracted from spindle 62 to free the lens. A thrust bearing 78 is provided similar to bearing 67 for taking up the end thrust and reducing the friction of sleeve 69. The latter has fixed thereon a driving gear 79. The above described means thus provides an efficient and conveniently manipulated construction for holding the work.

The gears 63 and 79 of the lens holding spindles mesh with gears 80 and 81 respectively fixed on the actuating shaft 49, so that the spindles are positively driven at synchronous speeds to obviate any slippage in their engagement with the lens.

The machine is preferably provided with resilient means for pressing the lens holding frame 58 towards the grinding element to maintain the desired grinding pressure. To this end bearing 51, Figure 5, has fixed therein a sleeve 82 supporting actuating shaft 49, and rotatably carried on this sleeve is a worm gear 83 the hub of which is extended to provide a bearing for the adjacent end of the lens holder frame. Meshing with gear 83 is a worm 84 fixed on a spindle 85 rotating in bearings 86, Figure 14, on the lens holder frame. The spindle extends toward the front of the machine and has fixed thereon a finger piece or knob 87 by means of which worm 84 may be rotated to rotate worm gear 83. Fixed at one end to the latter, Figure 5, is a spring 88 coiled about shaft 49 within the tubular bearing portion of the lens holder frame. The opposite end of the spring is fixed in the stationary bearing sleeve 57, so that the spring tends to rotate gear 83 and, by reason of the engagement of the latter with worm 84, to press the lens toward the grinding element. By turning knob 87 and worm 84 gear 83 may be rotated to wind up and tension the spring more or less to adjust the grinding pressure, as may be suitable for the number or thickness of lens blanks being ground. To present spring 88 from being coiled tight enough to grip shaft 49, a sleeve 89 of less diameter than the spring is inserted in the latter in loose engagement with the shaft. There is thus provided a convenient and effective means for regulating the grinding pressure to suit the work in hand.

Figure 14:
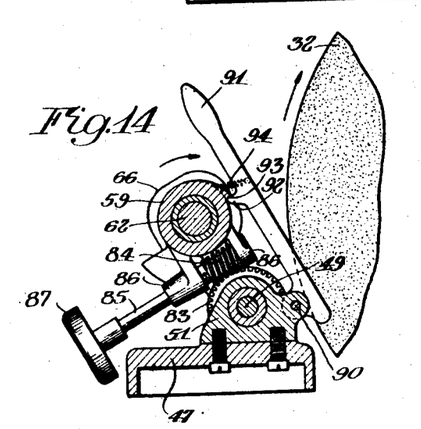
Figure 14 is a sectional view on the line 14ª—14ª of Figure 1.
Figure 15:
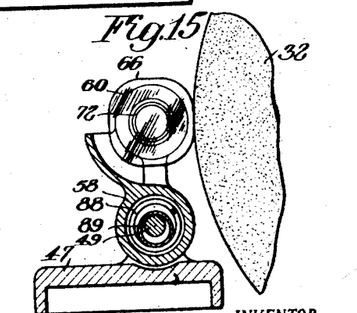
Figure 15 is a section on the line 15ª—15ª of Figure 5.

The lens holder frame may be moved and held away from the grinding element, as convenient during adjustments, for which purpose there is pivoted at 90 on the rear side of the shaft bearing 51, Figure 14, a lever 91 having a latch projection 92 positioned for engagement with a corresponding catch shoulder 93 on the bearing. A spring 94 fixed to the lever and the bearing holds the lever in cooperation with the latter and by pulling the lever forward the frame may be readily swung away from the grinding element and releasably latched in such position.

For grinding the peripheral edge of the lens to the desired shape the lens holder is provided with former or templet means rotated with the lens and cooperating with stop means on the frame of the machine. As it may be desired to give to the lens any one of a number of different shapes the present machine is advantageously provided with a magazine holder for a plurality of different formers or templets. Referring to Figure 5 it will be seen that the outer end of lens spindle 62 rotatably supports a wheel 95 having an elongated hub on which are detachably fitted and keyed a plurality of formers or templet plates 96. The periphery of wheel 95 is graduated in circular degrees, Figure 1, to form an indicating scale cooperating with an index mark 98 on the side of the gear 63 fixed on the lens spindle. It is therefore apparent that wheel 95 carrying the formers may be rotatably adjusted in accordance with the indicating means described to dispose the geometrical axes of the formers which coincide with the zero of the scale, in any desired angular relation with the lens spindle, the term geometrical axis being employed to designate an axis of peripheral shape or outline as distinguished from the optical axis of the lens. Wheel 95 is clamped in adjusted position by means of a knob 99 threadedly engaging the extremity of the spindle and serving also to hold the formers on the hub of the wheel.

The stop means cooperating with the formers to shape the lens is adjustably carried on the main frame for determining the size of the lens. The stop is preferably constituted by a plate 100, Figures 3 and 13, supported for rotary adjustment to bring a plurality of bearing surfaces to position for contact with a former, as the surfaces become worn in use. The plate is clamped between a pair of sleeves 101 and 102 supported on and threadedly engaged with a sleeve 103 sliding longitudinally in a bearing 104 in one of a pair of arms 105 and 106 at the upper end of a forked support 107. By unscrewing sleeve 102 the stop plate may be loosened for rotary adjustment on sleeve 103 for the purpose described, being accurately centered and securely held in adjusted position by means of a bolt 108 carried at its ends in the arms of the support and passed thru one of a series of openings 109 in the plate corresponding to the bearing surfaces of the latter. Sleeve 103 slides longitudinally on a shaft 110 passed thru the same and rotatably supported at one end in arm 106 but held against longitudinal movement as by means of a set screw 111. The shaft is formed with a spiral groove 112 in which engages a pin 113 fixed in sleeve 103 and sliding on the outside of the latter in a guide slot 114 in bearing 104. The shaft may be rotated by a knob 115 fixed thereon to produce longitudinal movement of sleeve 103 and the lateral adjustment of the stop plate opposite a selected one of the formers 96. Suitable detent means may be provided, such as the spring actuated ball 115a, for accentuating the positions of the stop and in the present instance knob 115 is marked with former designations such as "R" for round and "RO" for regular oval. Rotating the knob to bring one of these designations uppermost moves the slot opposite the corresponding former for cooperation therewith.

Figures 3, 13:
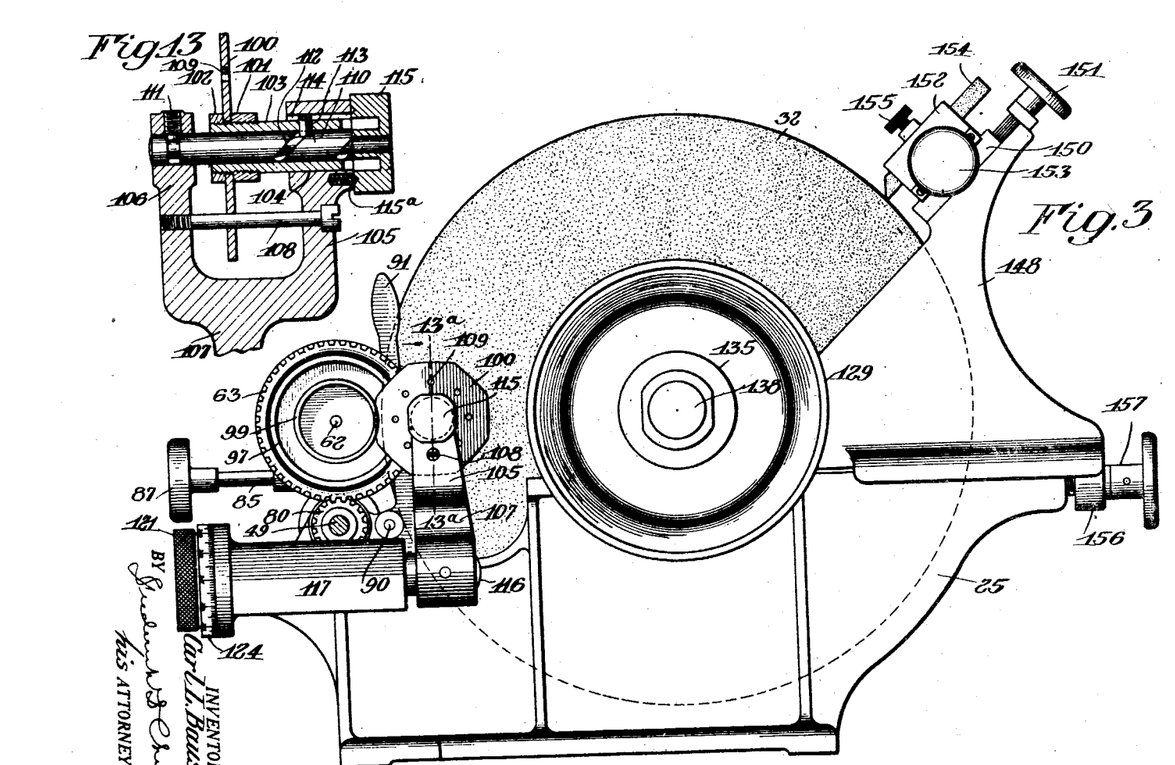
Figure 3 is a similar elevation of the opposite side of the machine.
Figure 13 is an enlarged sectional view on the line 13ª—13ª of Figure 3 showing the stop means for the former device.

The size of the lens is determined by adjustment toward and from the formers of the stop support 107 for which purpose the latter is fixed on the rear end of a rod 116, Figures 3 and 11, sliding longitudinally in a bearing 117 on the frame to which it is connected as by means of the key 118 to hold it against rotation. A reduced portion 119 at the forward end of the rod provides a chamber in the bearing in which is coiled about the rod a compression spring 120 bearing against the latter and the end of the bearing chamber. The rod projects forwardly of the end of the bearing and has threadedly engaged therewith a hand piece or knob 121 engaging the end of the bearing in opposition to the spring and serving by its rotation on the rod to adjust the latter longitudinally. The knob and a stationary part, such as the end of the bearing, are provided with cooperating indicating means as for example, an index mark 122 on the bearing and a scale 123 on the knob graduated to denote the lens sizes. As the grinding element may vary in size or the parts become differently adjusted so that the indication of this thickness setting device requires correction, means are preferably provided for correcting the reading of the same by resetting from time to time, as for example by substituting a blank of known size for the lens and adjusting the indicator to correspond with it. To this end scale 123 is marked on the periphery of a ring 124 rotatably carried between knob 121 and a disc 125 on the latter which is employed to clamp the ring to the knob after adjustment by means of a screw 126. Means are preferably provided for limiting the adjustment of knob 121 after setting of the scale to one complete rotation comprising a pin 127 carried by the bearing and working in a slot 128 in a ring 124 having a shoulder 128a for limiting engagement with the pin.

Figure 6:
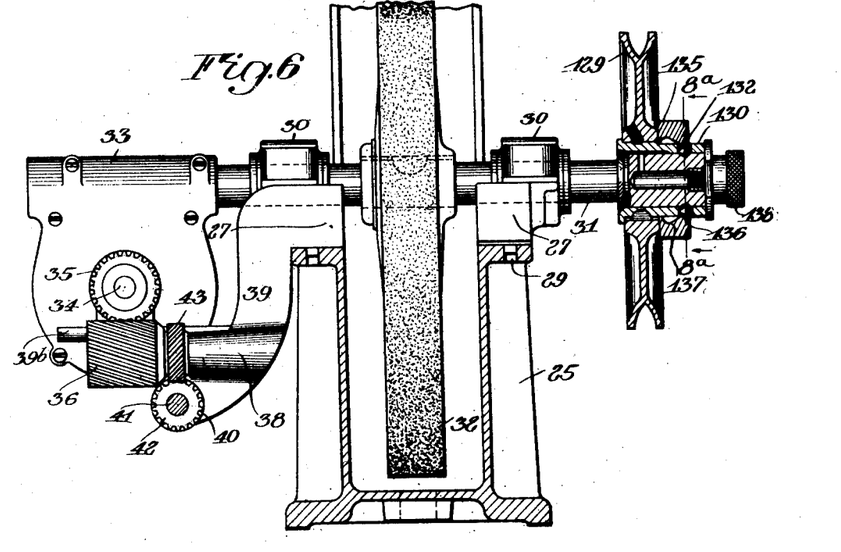
Figure 6 is a sectional elevation on the line 6ª—6ª of Figure 1.

The means for driving the main shaft comprises, preferably, a pulley 129, Figure 6, fixed on a bushing 130, in which are formed bores or ways 131 containing balls 132. The bushing is rotatably mounted on an enlarged end portion of the main shaft having formed therein opposite the ways 131 a series of corresponding recesses 133 having end shoulders 134 against which the balls are adapted to bind when held downwardly in the ways 131, thus fixing the pulley to shaft. Slidable longitudinally on bushing 130 is a collar 135 having a portion 136 closely fitting the bushing for holding the balls 132 in engagement with the shaft. Collar 135, adjacent of the other end of its bearing on the bushing, is enlarged as at 135 to provide a chamber for releasing the balls when the collar is moved to a corresponding position on the bushing. The collar thus provides convenient means for quickly clutching and unclutching the pulley for driving or stopping the machine. At 138 is shown a grease cup communicating in the usual or any suitable manner with the bearing surfaces.

Figure 7:
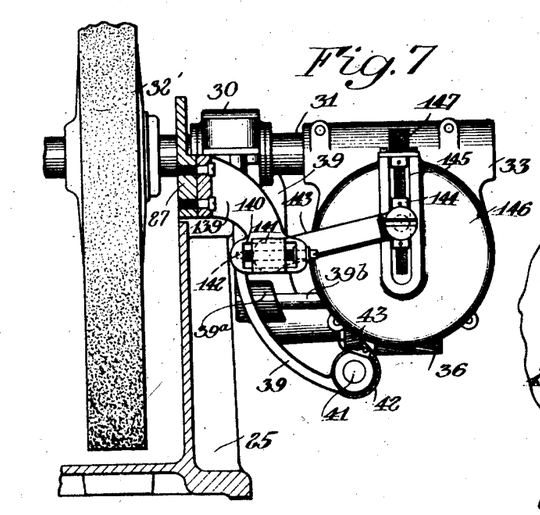
Figure 7 is a sectional elevation of a portion of the machine on the line 7ª—7ª Figure 1.
Figure 8:
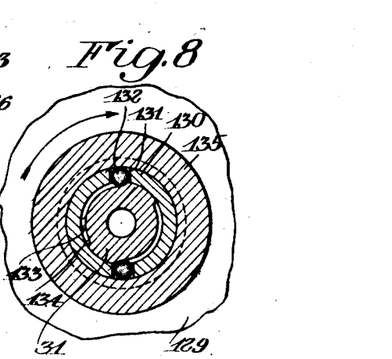
Figure 8 is a sectional elevation on the line 8ª—8ª of Figure 6.

The means for reciprocating the main shaft longitudinally comprises, preferably, a bracket 139 Figures 1, 2 and 7, carried by one of the auxiliary frames 27 and having formed in its enlarged end a bearing slot 140. Adjustably slidable in the latter is a block 141 with which is threadedly engaged a bolt 142 swivelled at its ends on the bracket for adjusting the block longitudinally in the slot. Pivotally connected with the block is a link 143 the opposite end of which is pivotally connected with a block 144 slidable in a bearing slot 145 in a rotary disc 146 on the rear side of gear casing 33 and driven by connection with the main shaft. Block 144 is adjustable longitudinally of the slot 145 by means of a spindle 147 threadedly engaged with the block and swivelled on the disc. The latter and its block 144 thus form an adjustable crank the throw of which may be varied to vary the amplitude of reciprocation of the main shaft and driving element to agree, for example, with the width of the work and the grinding element. By adjusting block 141 on the bracket 139 the locus of the reciprocating movement of the driving element may be varied independently of variation in the throw, to centralize the throw with reference to the work.

The machine is preferably supplied with a honing device truing the grinding element to maintain its grinding surface clean and accurate in outline. For this purpose the adjustable auxiliary frames 27 supporting the grinding element are extended rearwardly and upwardly, as at 148, Figures 2 and 3, and provided with a bed 149 on which slides radially of the grinding element a carriage 150 which is adjusted along the bed by threaded engagement with a spindle having an adjusting knob 151. Carriage 150 is formed with a guide way on which slides transversely of the grinding element a holder 152 adjusted on its ways by threaded engagement with a spindle having a knob 153. The holder adjustably supports a honing element 154 clamped in position by means of a set screw 155. By means of these various adjustments the honing element may be set to automatically true the grinding element during the rotation and transverse reciprocation of the latter.

The means for adjusting the auxiliary frames 27 and the grinding element on the main frame, toward and from the lens holder, as the element becomes worn, for example, or when a new element is substituted, comprises, preferably, a spindle 157 swivelled on part 148 and threadedly engaged in an opening in the main frame. The grinding element may be thus conveniently adjusted by turning spindle 157 by means of the hand piece provided after which the stop means may be adjusted as already described with relation to the position of the grinding element for accurately determining the size of the lens.

As already stated the former means is carried by the lens holder with the geometric axes or axes of outline of the formers in definite adjustable relation to one of the lens holding spindles and one of the important aspects of the present invention resides in this feature and in the provision of means for positioning the lens blank on the lens holder with its optical center coincident with the axis of a spindle with which the former device is associated, and with its optical axis accurately positioned in a given rotary relation to the spindle. The geometric axis of a former may then be conveniently positioned by rotation of the former to make any desired angle with the optical axis of the lens. The lens may therefore be located in the machine with reference solely to its optical center and axis and the relation between the optical axis and the outline of the lens accurately determined by adjustment of the machine parts supplied with indicating means as described, thus obviating the inconvenience and possible inaccuracies in the case of lenses whose optical and geometrical axes are displaced through an angle, of laying out such axes on each lens blank preliminary to its application to the machine.

Figures 17, 19, 21:
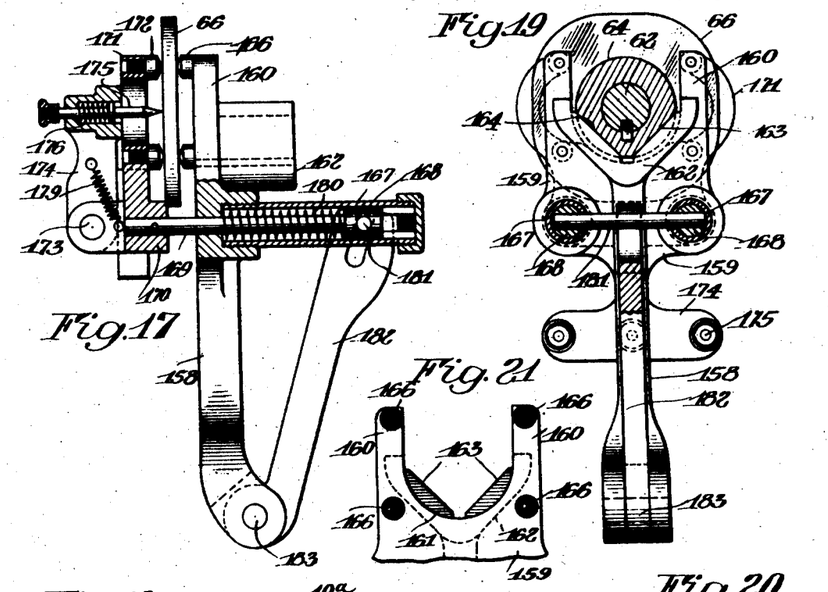
Figure 17 is a side elevation partly in section of a lens positioning clamp.
Figure 19 is a sectional view on line 19ª—19ª of Figure 18.
Figure 21 is a fragmentary elevation of a portion of the clamp as viewed from the line 21ª—21ª of Figure 18.

The positioning of the lens as described is accomplished by means of a clamp comprising, preferably, a member 158, Figures 17 to 21 inclusive, having a plate like enlargement 159 at one end which is forked to provide spaced arms 160 the inner sides of which are connected by a circular contact surface 161 adapted to fit the cylindrical extremity of the lens spindle. Member 158 is formed also with a lateral extension 162 the upper side of which comprises flat contact surfaces 163 arranged at an included angle with each other as shown in Figure 19. Lens spindle 64 is formed adjacent its end with flat surfaces 164 arranged at a complementary angle, it being apparent that clamp member 158 may be applied to the spindle as shown on Figure 18 with its surfaces 161 and 163 in engagement with the spindle surfaces 165 and 164 respectively and that by this means a lens gripped by the clamp and positioned thereon as hereafter described may be accurately positioned on the spindle. Portion 159 of clamp 158 carries on one side of its forked end a plurality of gripping knobs 166 of any suitable material for engaging the lens surface.

Figures 18, 20, 22:
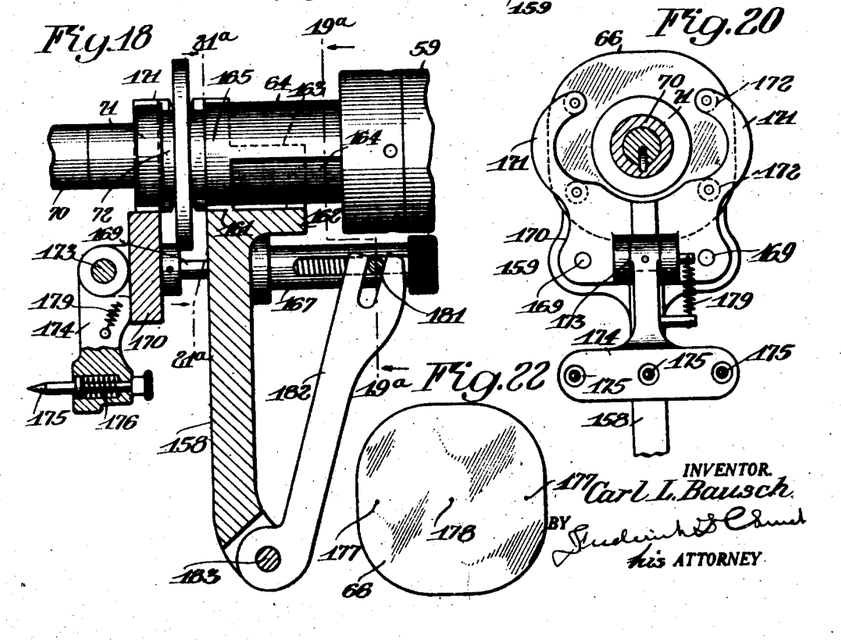
Figure 18 is a similar view showing the parts in different position and applied to the lens holding device.
Figure 20 is an elevation of the clamp as seen from the left in Figure 18.
Figure 22 illustrates a lens blank.

An opposing clamp member 170 is movably carried on member 158 by means comprising preferably a pair of tubular supports 167 spaced from each other on opposite sides of member 158. Sliding in each tube is an enlarged portion 168 of a rod 169 sliding also in a guide bearing in member 158 and having the opposing clamp member 170 fixed on its outer end. Rods 169 are moved to carry member 170 toward and from member 158 to grip and release the lens by means described below. Member 170 has at its upper end forked arms 171 preferably curved and spaced to clear lens spindle 70 as shown in the drawings. Arms 171 are provided with lens engaging knobs 172 similar to knobs 166 of member 158, it being apparent that a lens blank properly located between the clamp members may be gripped by the latter and applied to the lens holding spindle as already described.

The means for positioning the blank between the clamp members comprises preferably a part 174 pivotally supported at 173 adjacent the bottom of member 170 and carrying at its end a plurality of contact points 175 preferably yieldably supported in part 174 by the spring device 176 shown. These points of which there are in the present instance three, are located in alignment with each other for registry and engagement with marks 177 and 178 placed on the lens blank as shown in Figure 22 to indicate the optical axis and center respectively of the blank. When the latter is placed between the gripping members of the clamp, part 174 is moved to the position shown in Figure 17 and the blank adjusted to bring the described marks in register with the contact points 175. With the lens thus accurately located in the clamp, part 174 may be swung to inoperative position at one side as shown in Figure 18, so as to clear spindle 70 when the clamp is ready for application to the lens spindle to position the lens thereon as explained. A spring 179 may be provided for holding part 174 in its different positions. The means for moving the clamping members toward and from each other comprises preferably a spring 180 coiled about each rod 169 in its tubular support 167 and bearing against the clamp member and against the enlargement of the rod so as to resiliently press the clamping members toward each other to grip the lens. Rods 169 are connected by a transverse pin 181 engaged by the forked end of an arm 182 pivoted on clamp member 158 at 183. Members 158 and 182 thus form a convenient handle portion and by pressing these parts toward each other the clamp may be opened.

The operation of the machine has been described in connection with the explanation of its construction. With the lens holder swung away from the grinding element and latched by handle 91 and the spindles separated by manipulation of handle 77, a lens blank may be located in the clamp in the manner described and positioned on the right hand spindle with its optical center concentric with the spindle and its optical axis positioned with relation to the spindle as described. The blank is then gripped between abutting spindles and the clamp removed. The stop plate 100 may then be adjusted transversely by handle 115 to select the former to be employed and adjusted by means of hande 121 to determine the size of the lens. The amplitude and locus of reciprocation of the grinding element having been suitably adjusted and the latter set in rotation by movement of collar 135 to clutch the pulley to its shaft, the lens holder may be unlatched by manipulation of handle 91 and allowed to move toward the grinding element to bring the lens into engagement with the same. By means of handle 87 the grinding pressure may then be regulated. The machine automatically grinds the lens to the shape determined by the former or templet selected and as the operation nears completion crank 49ª may be rotated by hand at a speed higher than the normal grinding speed to accelerate the rotation of the blank and produce a more finished or polished surface.

As apparent from the description the machine is practical and efficient in construction and by reason of the various adjustments described is capable of producing lenses of a variety of sizes and shapes. The blanks may be accurately positioned in the machine with relation directly to their optical center and axis thus obviating the inconvenience of laying out on each blank the axis of shape or outline, the latter operation being quickly and accurately accomplish by the adjustment of the former means. The work is carried by a readily adjusted and manipulated holding device which holds the blank steadily in contact with the grinding element under a regulated degree of pressure. The work is rotated at a suitable grinding speed by the means described and this speed may be conveniently accelerated by the hand crank for producing a final polish on the ground surface. By reason of the advantageous construction and arrangement and the convenience of adjustment of the parts the machine is capable of accurate and rapid production of work.

I claim as my invention:

1. The combination of a grinding element, a rotary lens holder, actuating means for rotating the latter at a given grinding speed, and manually operative means for rotating said lens holder at a relatively higher speed during the operation of said actuating means to impart a finished surface to the lens.

2. The combination of a grinding element, a rotary lens holder, a rotary shaft for driving said lens holder, actuating means for rotating said shaft at a given grinding speed comprising a connection adapted to yield when said shaft is driven at a higher speed, and an auxiliary actuating device for driving said shaft and lens holder at a higher speed during the operation of said actuating means for imparting a finished surface to the lens.

3. The combination of a grinding element, a rotary lens holder, actuating means for rotating the latter at a given grinding speed, comprising an overrunning clutch adapted to yield when said lens holder is driven at a higher speed, and an auxiliary actuating device for driving said lens holder at a higher rate of speed during the operation of said actuating means for imparting a finished surface to the lens.

4. The combination of a grinding element, a rotary lens holder, a rotary shaft for driving said lens holder, actuating means for rotating said shaft at a given grinding speed comprising an overrunning clutch adapted to yield when said shaft is driven at a higher speed, and manually operable means for driving said shaft at a higher speed during the operation of said actuating means for imparting a finished surface to the lens.

5. The combination of a shaft provided with a grinding element, a main actuating means for rotating the same, a rotary lens holder, actuating gearing between said shaft and lens holder for rotating the latter at a given grinding speed comprising a connection adapted to yield when the lens holder is driven at a higher speed, and auxiliary means for driving said lens holder at a higher speed for imparting a finished surface to the lens.

6. The combination of a rotary grinding element, a rotary lens holder comprising a pair of rotary spindles arranged end to end for holding a lens therebetween, a shaft geared to both spindles for synchronously driving the same, actuating means for rotating said shaft at a given grinding speed and comprising a connection adapted to yield when said shaft is rotated at a higher speed, and hand means for rotating said shaft at a higher speed during the operation of said actuating means for imparting a finished surface to the lens.

7. The combination of a main frame, a rotary grinding element thereon, an auxiliary frame pivotally supported on said main frame, a rotary lens holder on said auxiliary frame a worm gear on the main frame rotatable about the pivotal axis of said auxiliary frame, an intermeshing worm rotatably adjustable on said auxiliary frame, and a spring for rotating said worm gear and pressing said lens holder with adjustable force toward said grinding element.

8. The combination of a grinding element, a rotary lens holder movable toward and from said element and provided with a cooperating former and stop for shaping a lens, a device for positioning a lens on said holder, its optical center concentric with said lens holder and with an optical axis thereof in a given relation to said holder and adjustable means for effecting a predetermined relation between the optical axis of the lens and a geometrical axis of said former.

9. The combination of a grinding element, a rotary lens holder movable toward and from said element and provided with a co- operating former and stop for shaping a lens, a device for positioning a lens on said holder, its optical center concentric with said lens holder and with an optical axis thereof in a given relation to said holder, and adjustable means comprising an index and scale for rotating said former through a predetermined angle to effect a predetermined relation between a geometrical axis thereof and said optical axis of the lens.

10. The combination of a rotary grinding element, a rotary lens holder movable relative to said element to shape a lens; devices for positioning a lens on said holder with its optical center on the axis of said holder and an optical axis thereof in a given rotary relation to said holder, carrying means for a plurality of formers rotatably adjustable on said holder, indicating means for adjusting said formers, and stop means for selective cooperation with the formers to selectively control the movement of said holders and the shape of the lens.

11. In a lens edge grinding machine, the combination of a grinding element, a rotary lens holding spindle movable toward and from said element, a lens forming element on said spindle and revoluble therewith, a stop engaged by said forming element to control the movement of the lens holding spindle, revoluble means cooperating with the spindle for holding a lens, means for positioning the lens in the holding means in a given rotary relation to the spindle, and a device for rotatably adjusting the forming element relative to the spindle to effect a predetermined angular relation between the axes of the lens and forming element.

12. In a lens edge grinding machine, the combination of a grinding element, a pair of rotary spindles movable one toward the other to hold a lens therebetween, a stop rotatably adjustable about an axis parallel to the axis of the spindles and adapted during rotation to be moved bodily from one operating position to another, lens forming elements on one of said spindles cooperating with said stop device in its different positions and adapted to move the spindles relative to the lens grinding element to shape the lens, means for adjusting a lens to a given rotary position relative to said spindle, and means for adjusting the stop device to properly position lenses of different sizes relatively to the grinding element.

13. In a lens edge grinding machine, the combination of a grinding element, a pair of rotary spindles movable one toward the other to hold a lens therebetween, a rotatably and slidably mounted stop adapted to be moved bodily upon rotation to different operating positions, lens forming elements on one of said spindles cooperating with said stop device in its different positions and adapted to move the spindles relative to the lens grinding element to shape the lens, means for adjusting the optical center and axis of a lens to a given rotary position relative to said spindle, and means for rotating said stop.

14. In a lens edge grinding machine, the combination of a grinding element, a rotary lens holding spindle, a wheel rotatably adjustable on said spindle and provided with means for interchangeably supporting a plurality of formers, an index on said spindle, a dial on said wheel for cooperation with said index to adjust the wheel, means for securing said wheel in adjusted position, and stop means for selective cooperations with said formers.

15. In a lens edge grinding machine, the combination of a rotary grinding element, a rotary lens holder movable relatively to said element to shape a lens, a former for controlling said movement of the holder, a support adjustable toward and from the former, a stop comprising a plate rotatably carried on said support for movement axially of the lens holder and having a plurality of peripheral bearing surfaces, said plate having also a plurality of recesses therein corresponding to said surfaces, and a part on said support cooperating with any one of said recesses to hold the corresponding surface in position for engagement with the former.

16. In a lens edge grinding machine, the combination of a rotary grinding element, a rotary lens holder movable relatively to said element to shape a lens, a plurality of formers carried by said holder, a support provided with a rotatable spindle, a stop slidably and rotatably carried on said spindle, and a device operated by rotation of the spindle for rotating and sliding the stop therealong to position the same for cooperation, selectively, with any of said formers.

17. In a lens edge grinding machine, the combination of a rotary grinding element, a rotary lens holder movable relatively to said element to shape a lens, a plurality of formers carried by said holder, a support provided with a rotatable spindle, a stop rotatable and slidable longitudinally on said spindle and comprising a plate provided with a plurality of peripheral bearing surfaces, guide means for holding said stop against rotation with any one of said surfaces in position to engage a former, and a device operated by rotation of said spindle for rotating and sliding the stop therealong to position the same for cooperation, selectively, with any of the formers.

18. In a lens edge grinding machine, a rotary grinding element, a rotary lens holder movable toward and from said element, devices for positioning a lens on said holder in a given relation, a plurality of formers adjustable on said holder to a predetermined angular relation with said lens, and a stop adjustable toward and from the formers to determine the size of the lens and also to position for cooperation selectively with any one of the formers to determine the shape of the lens.

CARL L. BAUSCH.